(12) United States Patent
James et al.

(10) Patent No.: US 7,376,521 B2
(45) Date of Patent: May 20, 2008

(54) FLOW COMPUTER WITH NETWORKED I/O MODULES

(75) Inventors: Vinton L. James, Port Aransas, TX (US); Bradley N. Foster, Corpus Christi, TX (US); David P. Sonka, Corpus Christi, TX (US); Thomas E. McCray, Corpus Christi, TX (US); Robert W. Briscoe, Corpus Christi, TX (US); Brian T. Snapka, Corpus Christi, TX (US); Rolf B. Moholth, Kongsberg (NO)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/359,103

(22) Filed: Feb. 22, 2006

(65) Prior Publication Data

US 2007/0198221 A1 Aug. 23, 2007

(51) Int. Cl.
*G01F 1/00* (2006.01)
*G01F 7/00* (2006.01)
(52) U.S. Cl. .................................................. 702/45
(58) Field of Classification Search ................ 702/45
See application file for complete search history.

(56) References Cited

U.S. PATENT DOCUMENTS 5,504,693 A * 4/1996 Elliott et al. ............... 700/282
6,609,070 B1 * 8/2003 Lueck ......................... 702/50
7,099,781 B1 * 8/2006 Heidl et al. .................. 702/45
2007/0284293 A1 * 12/2007 Pitchford et al. ............. 210/85

OTHER PUBLICATIONS

Wikipedia, "Graphics", Oct. 2007, pp. 1-8.*
wikipedia "Pixel", Oct. 2007, pp. 1-7.*
"System Architecture and Installation"—Omni Flow Company, Inc., 1993.
"Smith Flow Computer Sybertrol™ Operation"—FMC Energy Systems, MN09045 Issue/Rev. 0.6, 2001.

* cited by examiner

*Primary Examiner*—John Barlow
*Assistant Examiner*—Cindy D. Khuu
(74) *Attorney, Agent, or Firm*—Williams, Morgan & Amerson, P.C.

(57) ABSTRACT

A flow computer is operable to interface with a first instrument suite associated with a first flow monitoring system. The flow computer includes a network, a first input/output (I/O) block, and a first processing unit. The first I/O block is coupled to the network and operable to communicate with the first instrument suite. The first processing unit includes a first display. The first processing unit is coupled to the network and operable to communicate with the first I/O block to receive flow monitoring data from the first instrument suite, process at least a subset of the flow monitoring data to generate flow output data, and generate a graphical image of the flow monitoring system on the display. The graphical image includes at least a subset of the flow output data.

24 Claims, 8 Drawing Sheets

| Ethernet Module 205 | Digital Input Module 210 | Digital Output Module 215 | Fused Power Module 235 | Analog Input Module 220 | Analog Output Module 225 | E-Fused Power Module 240 | Frequency Input Module 230 | Digital Input Module 210 |

| E 205 | DI 210 | DO 215 | DO 215 | FP 235 | AI 220 | FP 235 | AI 220 | FP 235 | AI 220 | EP 240 | FI 230 |

| | | |
|---|---|---|
| 06/01/16 08:18:05 | | Alarms Supervisor |
| | Menus\METERS\CONTROL\BATCH\SETUP\CURRENT BATCH | |
| | Tag | Batch#1 |
| | Fluid Record | 1 |
| | Fluid Name | Fluid #1 |
| | Target | 1000000.000 M3 |
| | Source | Tankage |
| | Destination | FSO 'America' |
| Meter #1 | | Meter #2 |

Figure 6

| | | |
|---|---|---|
| 06/01/16 08:16:37 | | Alarms Supervisor |
| | Menus\METERS\CONTROL\BATCH\CONTROL | |
| | Start Batch? | No |
| | Current Batch Number | 1 |
| | Current Gross Volume | 0.000 M3 |
| | RECALCULATION | |
| Meter #1 | | Meter #2 |

FLOW COMPUTER WITH NETWORKED I/O MODULES

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to industrial control and, more particularly, to a flow computer with networked I/O modules.

Flow control and monitoring systems are employed in a variety of industrial applications, such as refining, chemical processing, product distribution, dairy processing, etc. Flow computers may be used with liquid or gas products. Typically, process inputs, such as temperature, pressure, flow meter pulses, density, and the like, are provided to a processing unit and processed to generate flow information, such as flow rate, total volume delivered or produced, total mass, etc.

Liquid metering applications range from relatively small liquid production units, to fiscal and custody transfer flow metering systems, to large-scale crude export facilities (i.e., involving high volume transfer of crude oil). Gas metering applications include production well meters, fuel and flare gas metering, and large pipeline transportation facilities.

Conventional flow computers are typically implemented using an architecture whereby the instruments for a metering application are connected a processing device to complete the flow calculations. In some cases, the unprocessed sensor signals are directly connected to standalone or rack/panel mounted device that uses the sensor data to complete the flow calculations. In other cases, distributed I/O modules may be used to consolidate data from multiple sensors and send the data over dedicated signal lines (e.g., serial connections) to the processing unit. In either implementation, dedicated connections between the sensors and the flow computer processing unit are used. A single processing unit is paired with a single sensor suite to implement the flow computer.

This architecture limits the flexibility and increases the cost of flow monitoring systems. A separate flow computer and sensor suite is required for each monitoring application. To implement a redundancy scheme, the entire system must be duplicated, including the I/O modules, processing unit, and cabling connecting the I/O modules to the processing unit.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a flow computer operable to interface with a first instrument suite associated with a first flow monitoring system. The flow computer includes a network, a first input/output (I/O) block, and a first processing unit. The first I/O block is coupled to the network and operable to communicate with the first instrument suite. The first processing unit includes a first display. The first processing unit is coupled to the network and operable to communicate with the first I/O block to receive flow monitoring data from the first instrument suite, process at least a subset of the flow monitoring data to generate flow output data, and generate a graphical image of the flow monitoring system on the display. The graphical image includes at least a subset of the flow output data.

Another aspect of the present invention is seen in a system including a plurality of flow meter systems, an instrument suite associated with each of the flow meter systems, at least one I/O block associated with each instrument suite, a network coupled to the I/O blocks, and a first processing unit. The first processing unit is coupled to the network and operable to receive flow monitoring data associated with a first subset of the flow meter systems from the I/O blocks and process the flow monitoring data to generate flow output data for first subset of flow meter systems.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
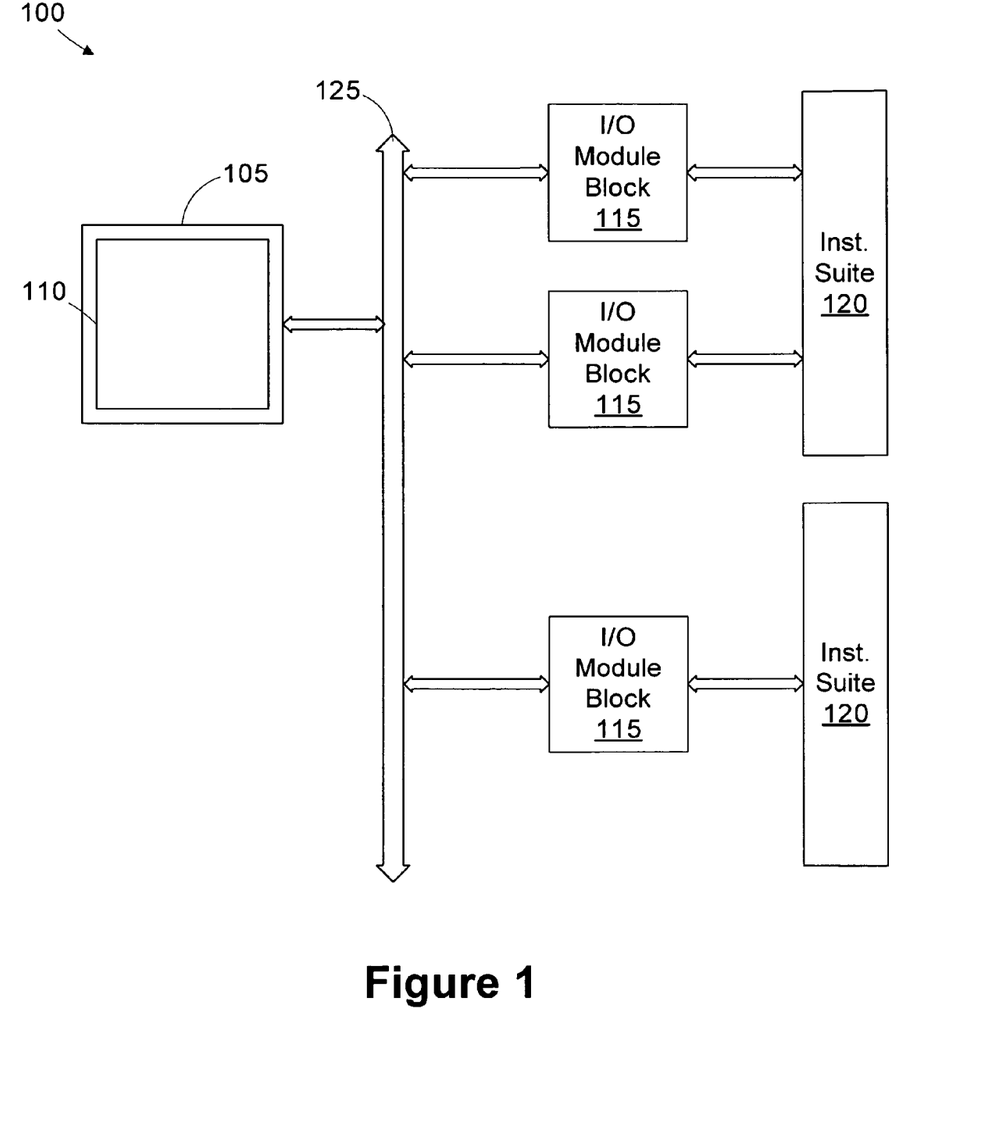
FIG. 1 is a simplified block diagram of a flow computer in accordance with one illustrative embodiment of the present invention.

Referring now to the drawings wherein like reference numbers correspond to similar components throughout the several views and, specifically, referring to FIG. 1, the present invention shall be described in the context of an exemplary flow computer 100. The flow computer 100 includes a processing unit 105 including a display 110, one or more input/output (I/O) module blocks 115, one or more meter run/prover instrument suites 120, and a network 125 connecting the I/O module blocks 115 to the processing unit 105.

The processing unit 105 performs flow calculations based on the data provided by the instrument suite 120 and serves as a human interface module for displaying the flow computer result data and allowing configuration of the flow computer 100. Exemplary data provided by the instrument suite 120 includes meter pulses, temperature, pressure, reference density (gravity), observed density, density temperature, density pressure, brine, sediment and water (BSW), remote setpoints or process variables, strainer differential pressure, high range differential pressure (gas), low range differential pressure (gas), prover outlet temperature and pressure, prover inlet temperature and pressure, flow control valve output, flow rate output, auxiliary output, prover select input, fuse data, fourway forward status, fourway reverse status, fourway seal status, fourway forward command, fourway reverse command, etc.

In the illustrated embodiment, the processing unit 105 is implemented using a panel computer having a touch screen display, such as a model PPC-872T offered commercially by Nagasaki IPC Technology Group of Taipei, Taiwan. The processing unit 105 and I/O module blocks 115 communicate over the network 125 using a packet-based protocol, such as Ethernet. The network topology allows high-speed communication between the processing unit 105 and the I/O module blocks 115. For ease of illustration, the network 125 is illustrated as a simple bus connecting the processing unit 105 and I/O module blocks 115 in parallel. Those of ordinary skill in the art will recognize that various network configurations may be used. For example, an Ethernet hub or an Ethernet switch may be used as a common connection point between the processing unit 105 and the I/O module blocks 115.

As will be described in greater detail below, the network topology allows a single processing unit 105 to interface with multiple instrument suites 120 for different monitoring applications, thereby implementing multiple flow computer applications using a single processing unit 105. The topology also allows redundant systems to be easily implemented and configured, as described below in reference to FIG. 12.

Figure 2:
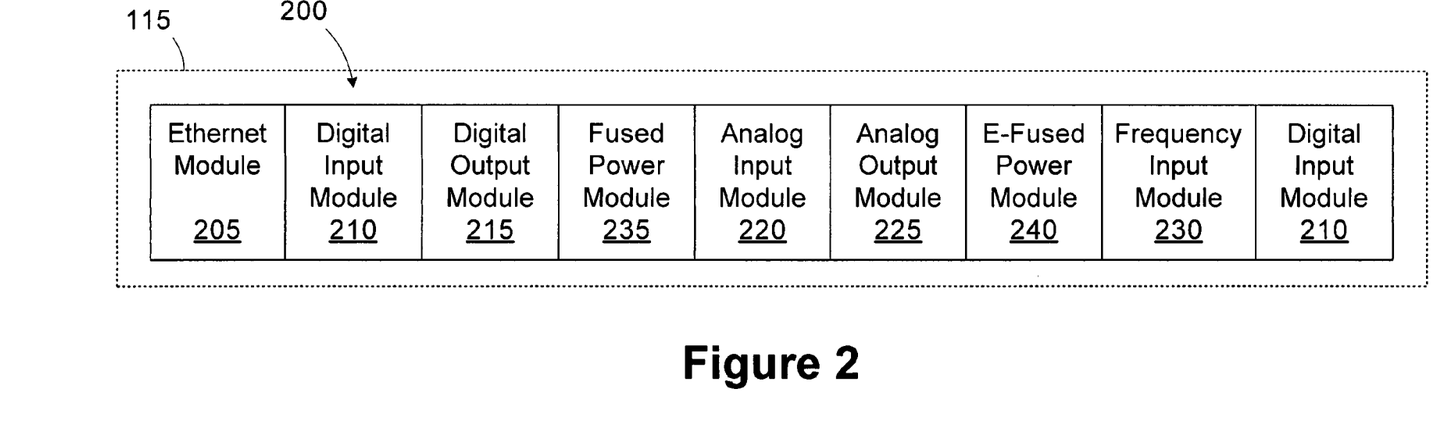
FIG. 2 is a simplified diagram showing I/O modules used in a metering I/O block in the flow computer of FIG. 1.

Turning now to FIG. 2, a simplified block diagram illustrating the arrangement of an I/O module block 115 for a flow metering application is provided. The I/O module block 115 includes a plurality of I/O modules 200 that may be arranged in different configurations depending on the particular requirements of the flow monitoring application. Exemplary module types include an Ethernet module 205 for communicating over the network 125, a digital input module 210, a digital output module 215, an analog input module 220, an analog output module 225, a frequency input module 230 for monitoring meter pulses or a densitometer input, a fused power segment module 235, and an electronically fused power segment module 240. Additional I/O modules 200 may also be used for the prover and quality measurement variables. Also, although the primary communication is handles using an Ethernet network, additional I/O modules (not shown) may be provided to support other protocols, such as RS232/RS485 serial communication. I/O modules 200 suitable for use in the I/O module block 115 are offered commercially by FMC Technologies, Inc. of Houston, Tex.

In the illustrated embodiment, a single frequency input module 230 may be used per I/O module block 115. The frequency input module 230 receives the meter pulses from a frequency-type meter (e.g., turbine meter, P.D. meter, ultra-sonic meter, etc.) and performs pulse integrity checking. The frequency input module 230 may also receive an input from a prover volume detect switch for pulse counting during meter calibration. The frequency input module 230 may also be used to receive a frequency signal from a densitometer. Each frequency input module 230 can support two densitometer inputs or a single meter pulse input. If multiple frequency input modules 230 are required, multiple I/O module blocks 115 are used, each with its own Ethernet module 205.

In some embodiments, the frequency input module 230 may be programmable. To increase the resolution of the pulse count measurement, thereby increasing its accuracy, the frequency input module 230 may interpolate pulse information between counts. Conventionally, fractional pulse counting is used in a flow metering system to allow the use of smaller prover runs. Industry guidelines for performing pulse interpolation using a double-chronometry technique are detailed in API standard, "Manual of Petroleum Measurement Standards," Chapter 4, Section 6 available from the American Petroleum Institute and incorporated herein by reference in its entirety. Other pulse interpolation techniques may be used, and the application of the present invention is not limited to a particular interpolation technique.

Calculating the pulse interpolation data in the frequency input module 230 provides enhanced the accuracy as compared to prior implementations that interpolate the pulses in the flow computer processing unit 105, because the interpolation calculation occurs closer to the source of the pulse counts. Pulse counting techniques are susceptible error caused by electrical interference, and by interpolating the pulses in the frequency input module 230, the potential for such interference is reduced.

The frequency input module 230 has an associated electronically fused power segment module 240 that physically isolates the power to the field device and protects the field wiring with an electronic fuse. Should an overcurrent event occur, the electronically fused power segment module 240 will turn off field power. The electronically fused power segment module 240 allows automatic fuse reset, obviating the need for operator intervention. After a predetermined delay, the processing unit 105 will attempt to reset the electronic fuse to reactivate the field circuit.

If the frequency input module 230 is installed for monitoring a frequency-type meter and the meter will be calibrated against a bi- or uni-directional prover, an additional digital input module 210 may be installed following the frequency input module 230 to monitor the seal status of a fourway valve 510 of the prover 505 (see the discussion of FIG. 5 below).

Each analog input module 220 has an associated fused power segment module 235 for powering the analog loop. The power and common connections for the analog loop are obtained from the fused power segment module 235 and the signal is connected to the analog input module 220. Any number of module pairs (i.e., analog input module 220 and fused power segment module 235 may be installed in an I/O module block 115.

In the illustrated embodiment, each analog output module 225 has two analog outputs. The loop power for the analog output is supplied by the analog output module 225, and the module is capable is driving up to 500 Ohms. Any number of analog output modules 225 may be installed in an I/O module block 115.

Figure 5:
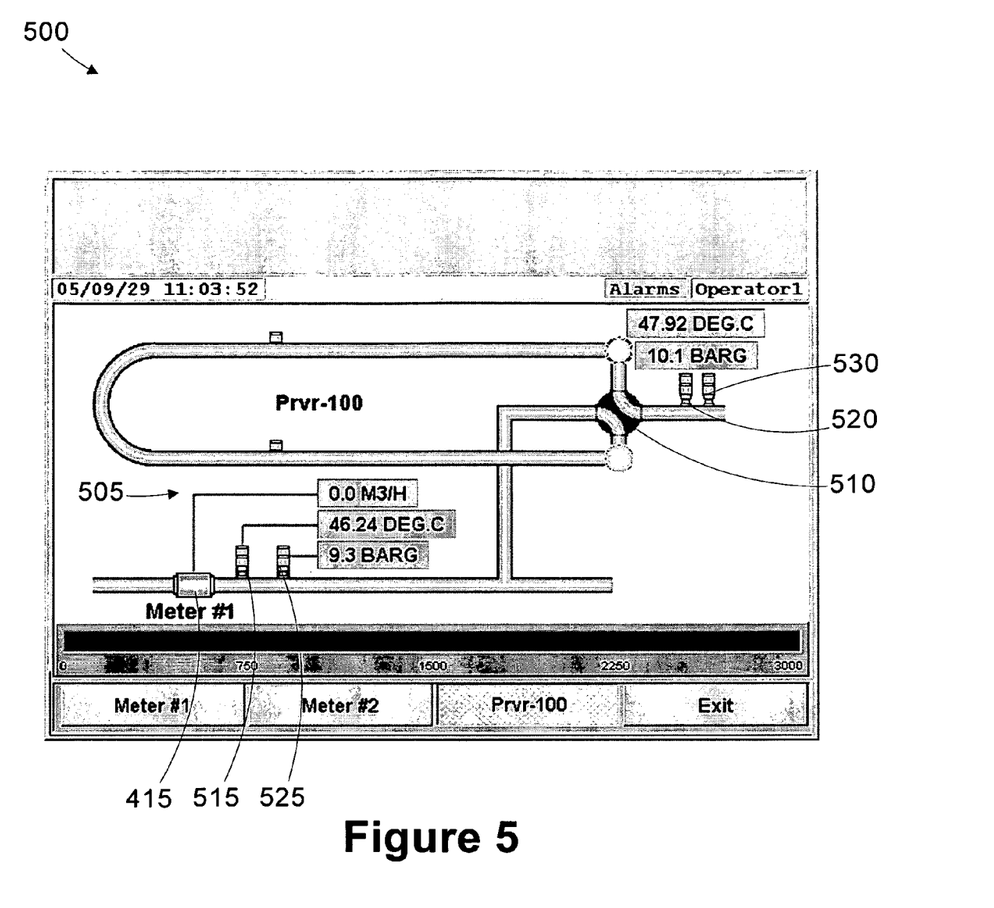

Referring briefly to FIG. 5, a prover screen 500 illustrating a diagram of a prover 505 is illustrated as it may be displayed graphically on the display 110 of the processing unit 105. The prover 505 includes a fourway valve 510, inlet and outlet temperature transmitters 515, 520 and inlet and outlet pressure transmitters 525, 530 for calibrating a flow meter 415. The operation of the prover 505 is well known to those of ordinary skill in the art, so it is not described in greater detail herein.

The instruments associated with the prover 505 may be installed in any of the I/O module blocks 115 of the flow computing system, such as the meter run I/O module block 115 of FIG. 2 by adding additional input and output modules 210, 215, 220, 225. Although not illustrated, these prover 505 I/O modules 200 could reside in one of the meter run module assemblies, such as that shown in FIG. 2. However, for ease of maintenance, the modules 200 for the prover 505 signals may be located in the same I/O module block 115 as the quality measurement instruments, as illustrated in the prover/quality I/O module block 300 shown in FIG. 3.

Figure 3:
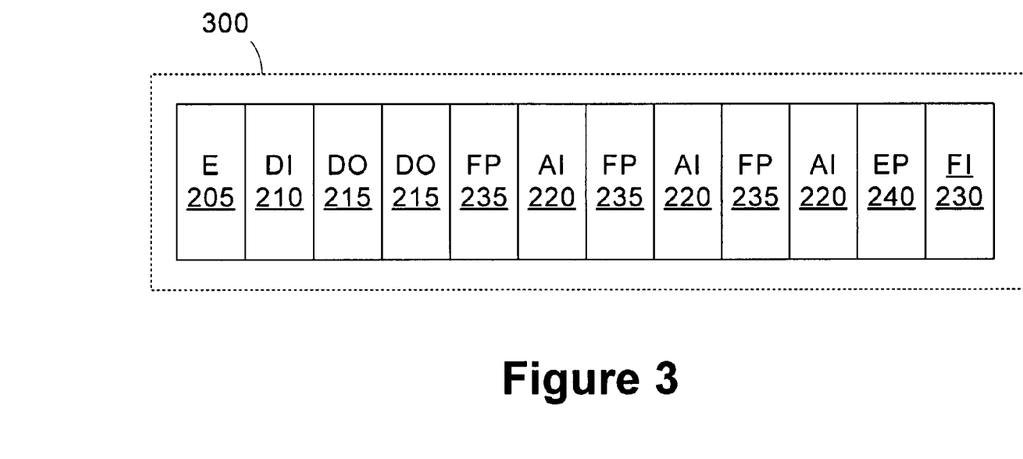
FIG. 3 is a simplified diagram showing I/O modules used in a prover/quality I/O block in the flow computer of FIG. 1.

Similar to the meter module I/O module block 115 of FIG. 2, an Ethernet module 205 and a frequency input module 230 (for prover densitometer data) are provided for the prover/quality I/O module block 300. The other required I/O modules 200 depend on the signals present on the prover and quality measurement equipment.

In the example of FIG. 3, the prover has two digital inputs indicating the forward and reverse status of the fourway valve 510. As indicated above, the volume detect switches from the prover 505 are routed to the frequency input module 230 for the meter I/O module block 115 (see FIG. 2), and the fourway seal monitor is routed to the digital input module 210 in the meter run I/O module block 115 following its frequency input module 230 (see FIG. 2). Accordingly, two digital inputs are required for the prover 505. Since each digital input module 210 handles two inputs, one digital input module 210 is provided to receive the two prover 505 signals.

The prover 505 also has two digital outputs, the forward and reverse commands to position the fourway valve 510. Each digital output module 215 supports one digital relay output, so two digital output modules 215 are required for the prover 505.

The prover 505 uses four analog inputs, one for each of the temperature transmitters 515, 520 and pressure transmitters 525, 530. The quality measurement equipment uses one analog input for the temperature on the densitometer. A frequency input module 230 is provided for the densitometer signal.

Altogether, the prover 505 and the quality measurement equipment require five analog inputs. Since each analog input module 220 has two points, three analog input modules 220 and three associated fused power segment modules 235 are provided.

In the example of FIG. 2, no analog output signals are required for the prover 505 or quality measurement equipment, so no analog output modules 225 are required in this I/O module block 115.

Figure 4:
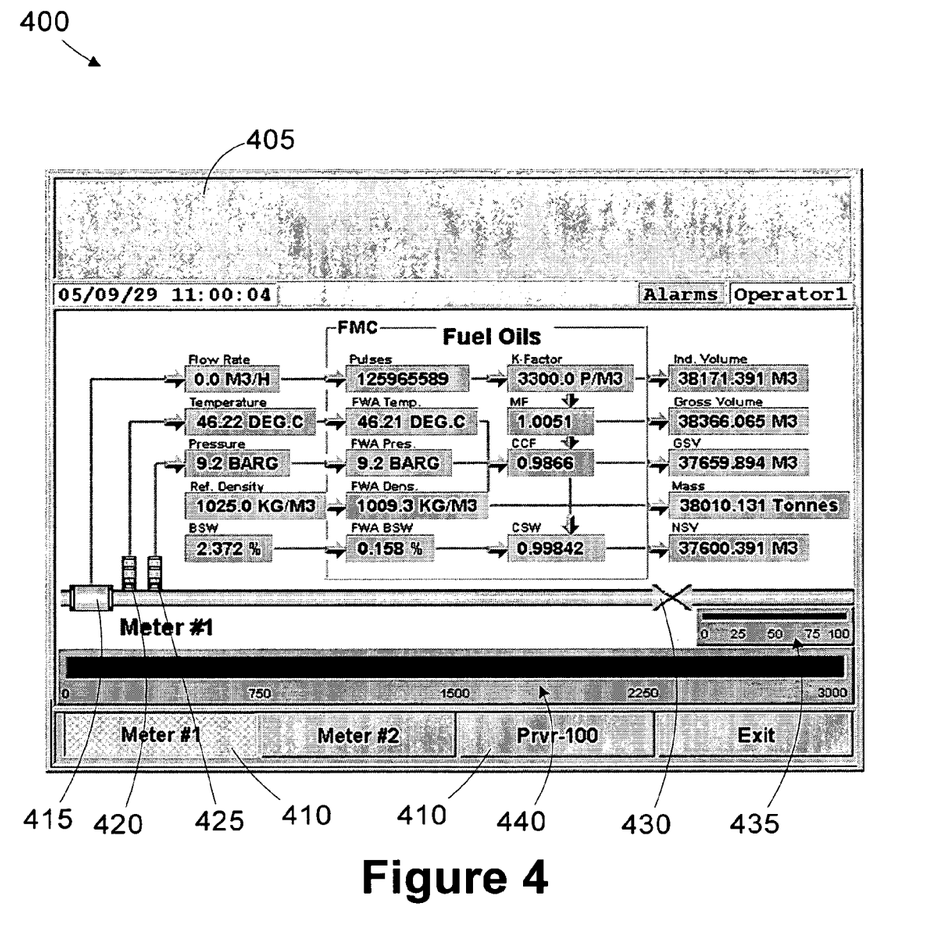
FIGS. 4-9 illustrate exemplary graphical screen displays generated by the flow computer of FIG. 1.

Turning now to FIGS. 4-9, illustrative graphical user interface screens shown on the display 110 of the processing unit 105 are provided. Referring first to FIG. 4, an exemplary meter run screen 400 is shown. The meter run screen 400 provides a graphical illustration of the associated meter run and displays data associated with the meter run. A status window 405 provides a chronological list of events (e.g., log in, log out, errors, status changes, and the like) associated with the flow computer 100. Navigation buttons 410 are provided for changing the information shown on the display 110 (e.g., information for other meter runs, prover information, trending information, batch setup and run information, etc.).

The meter run screen 400 illustrates a flow meter 415 and its associated temperature transmitter 420, pressure transmitter 425, and control valve 430. A status control 435 indicates the position of the control valve 430 in terms of percentage open. A flow rate control 440 indicates a bar graph of the flow rate determined by the flow meter 415.

Measured and computed parameters associated with the meter run are also displayed on the meter run screen 400. An illustrative, but not exhaustive, list of such parameters include meter flow rate, meter pulses, K-factor (nominal pulses per unit volume), indicated volume (pulses/K-Factor), temperature, flow weighted average (FWA) temperature, meter factor (correction factor accounting for non-linearity of flow meter output), gross volume, pressure, FWA pressure, combined correction factor (includes correction factors for the meter, temperature, and pressure), gross standard volume (Ind. Volume×CCF), reference density (observed density, temperature and pressure corrected to reference conditions), FWA density, brine, sediment and water (BSW) percentage, FWA BSW, BSW correction factor (CSW), and net standard volume (GSV×CSW). The meter run screen 400 allows convenient display of the useful parameters associated with the meter run in a graphical format.

Turning now to FIG. 5, an exemplary prover screen 500 is shown. As indicated above, the prover screen 500 graphically depicts the prover 505, fourway valve 510, temperature transmitters 515, 520 and pressure transmitters 525, 530 for the flow meter 415. Prover inlet and outlet temperatures and pressures are displayed on the prover screen 500 along with the flow rate measured by the flow meter 415. The prover screen 500 allows convenient display of the useful parameters associated with the prover 505 in a graphical format.

Although the screens 400, 500 suggest that the meter and prover data are displayed only one at a time, it is contemplated that this data may be displayed concurrently on the display 110. Moreover, when the flow computer 100 services multiple flow monitoring systems, the images for each system may be shown concurrently.

Figure 6:
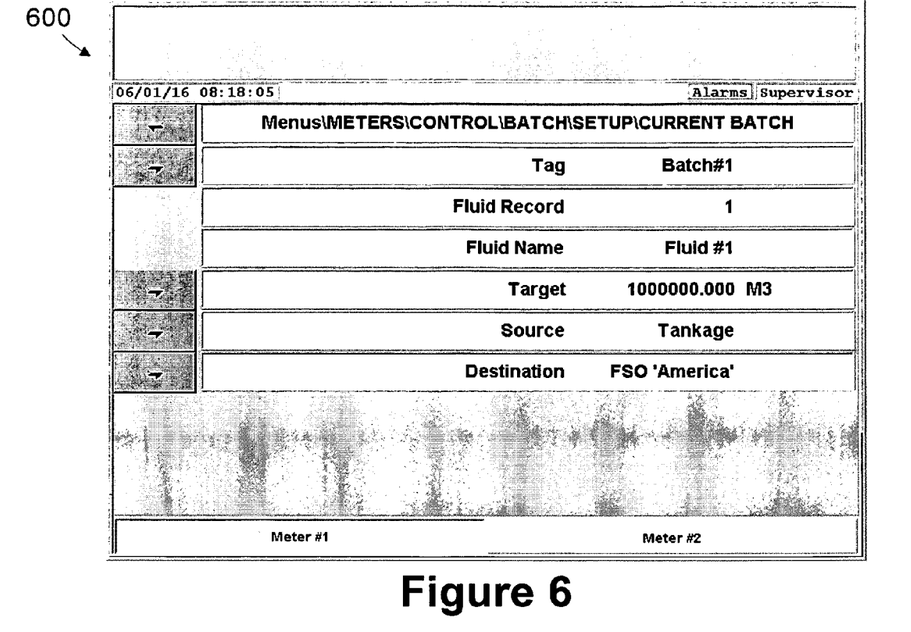
Figure 7:
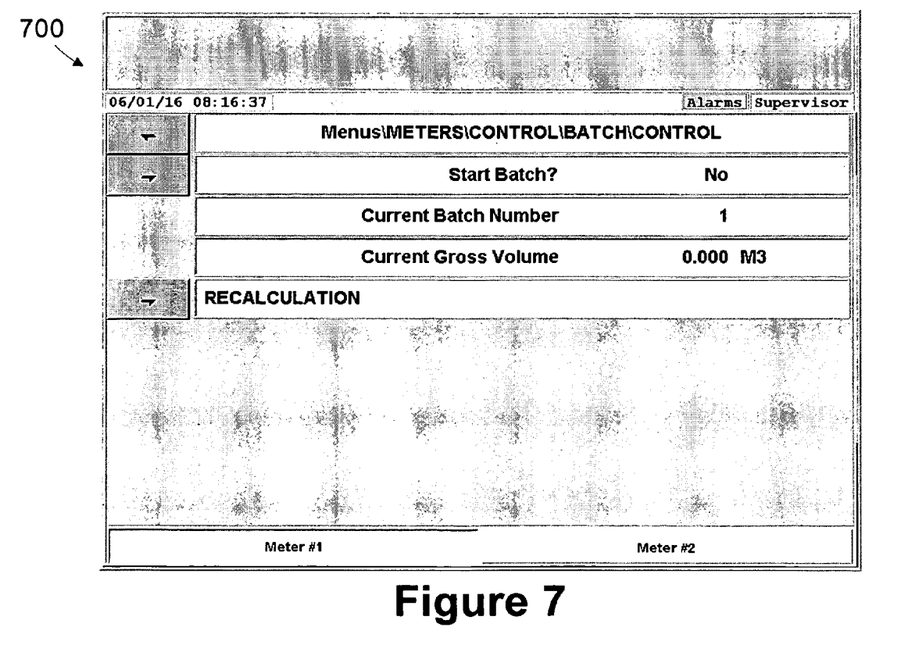

FIGS. 6 and 7 illustrate control screens 600 and 700 for specifying batch setup information and initiating a batch, respectively. On the batch setup control screen 600 of FIG. 6, a user may specify batch parameters, such as tag, record, fluid name, target volume, source, and destination. On the batch initiation screen 700 of FIG. 7, the user may start the batch operation.

Figure 8:
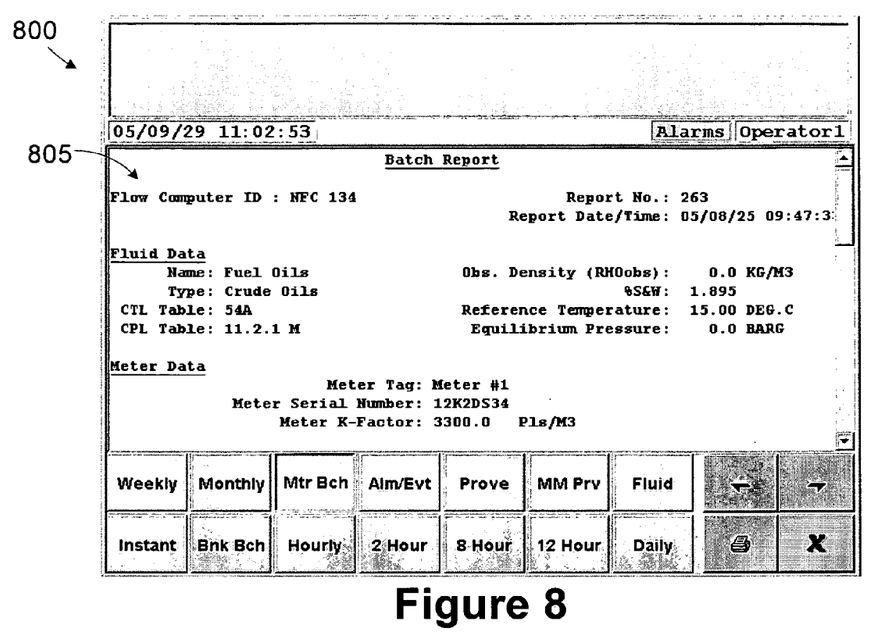
Figure 9:
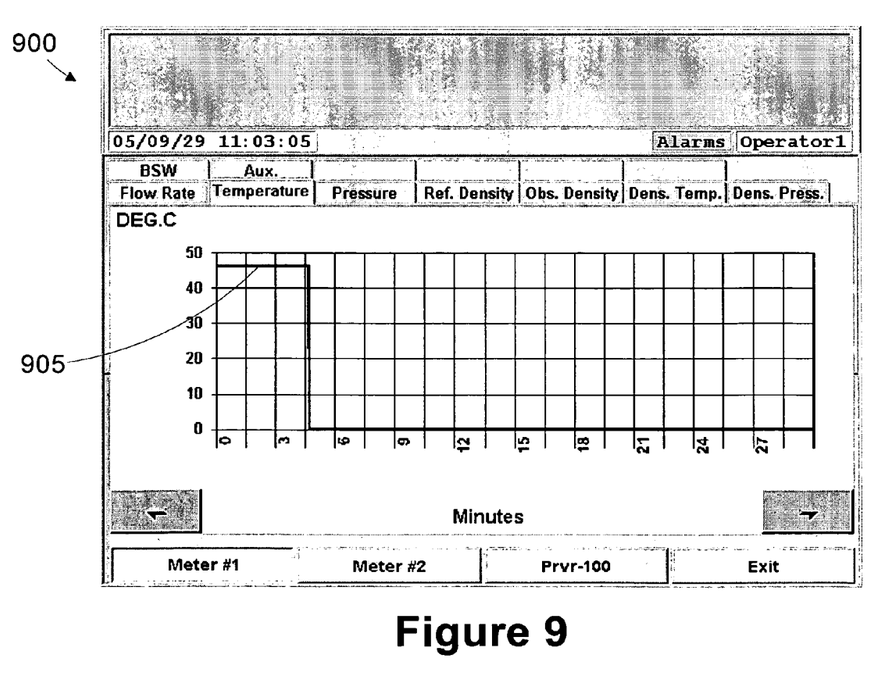

Referring to FIGS. 8 and 9, data received or determined by the flow computer 100 may be displayed on data screens 800 and 900. The data screen 800 of FIG. 8 displays a batch report 805, while the data screen 900 of FIG. 9 allows the display of time graphs 905 for various parameters associated with a meter run application.

Figure 10:
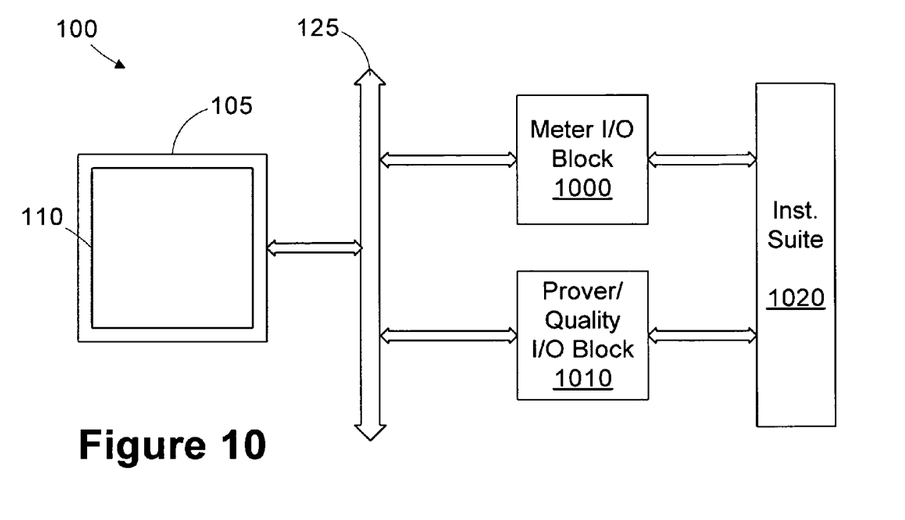
FIGS. 10-12 are simplified block diagrams of alternative embodiments of the flow computer of FIG. 1 adapted for a single meter application, a multiple meter application, and a redundant application, respectively.
Figure 11:
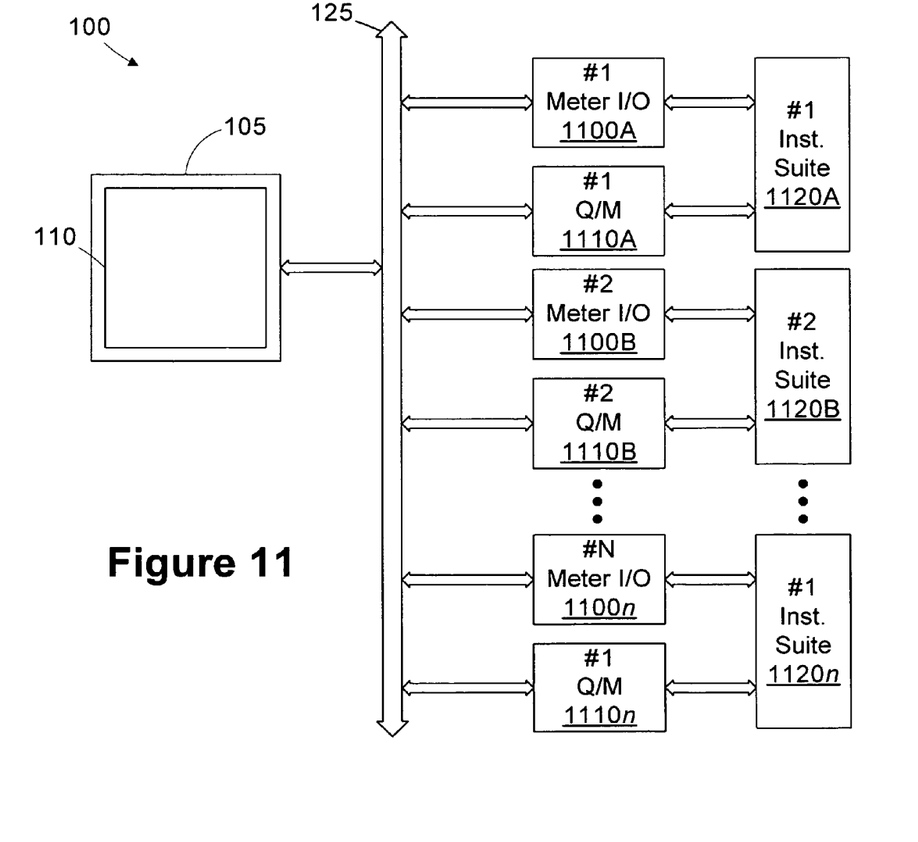
Figure 12:
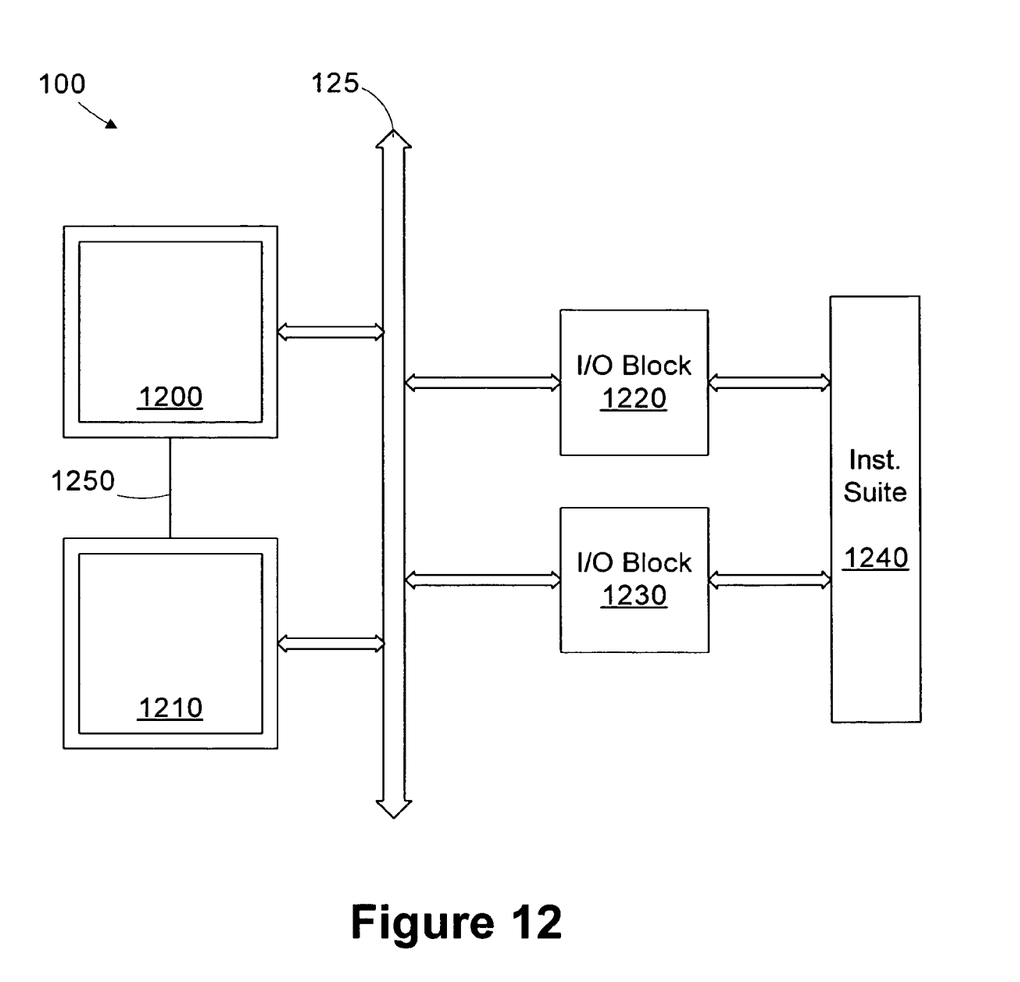

As mentioned above, the network based architecture of the flow computer 100 allows increased flexibility. Various exemplary configurations are illustrated in FIGS. 10-12. First, FIG. 10 illustrates the configuration of the flow computer 100 to support a single meter run. The processing unit 105 is coupled by the network 125 (e.g., Ethernet bus) to a meter I/O block 1000 and a prover/quality I/O block 1010 that receive data from an instrument suite 1020 associated with the meter run. Additional I/O blocks may be used depending on the particular flow metering application. For example, in an application where multiple pulse signals are provided to the flow computer 100, each pulse signal would require its own I/O block.

In the application shown in FIG. 11, the processing unit 105 services multiple meter runs. Because the processing unit 105 can support multiple meters, only the I/O blocks for each meter run need be duplicated for each meter run. This architecture greatly reduces the cost associated with the metering runs, as distinct flow computers for each meter run are not required. Like the single meter application, the processing unit 105 is coupled to the network 125. Meter I/O blocks 1100(A-n) and prover/quality I/O blocks 1110(A-n) are provided for each meter application and associated instrument suite 1120(A-n), as needed.

As shown in FIG. 12, the flexible architecture of the flow computer 100 also allows the implementation of redundancy in the metering application. First and second processing units 1200, 1210, and redundant I/O blocks 1220, 1230 are provided to interface with the instrument suite 1240. The redundant I/O blocks may be provided for the meter run data, prover/quality data, or both. Although both redundant processing units 1200, 1210 and redundant I/O blocks 1220, 1230 are shown, redundancy may be provided for only one of the elements. A communication link 1250 may be provided between the processing units 1200, 1210 to allow communication of primary and secondary status and health information. Also, the processing unit 1200, 1210 selected as primary may communicate the flow monitoring data to the secondary processing unit 1200, 1210 such that the data is current in both units 1200, 1210 to allow the secondary unit 1200, 1210 to take over processing should a fault be identified with the first unit 1200, 1210. The communication link 1250 may be independent of the network 125 so that the units 1200, 1210 can remain synchronized even if the primary unit 1200, 1210 loses its network connection. Each processing unit 1200, 1210 can determine if it is primary, secondary or backup. The I/O blocks 1220, 1230 can be polled to determine if a fault exists, and a different I/O block 1220, 1230 may be selected as primary as determined by the primary processing unit 1200, 1210.

The flow computer implementations of FIGS. 11 and 12 may also be combined. For example, multiple processing units and I/O blocks may be provided for multiple metering applications. Any of the processing units on the network may act as a primary flow computer for any of the meter runs. Redundancy in control or I/O may be provided for only selected meter runs.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A flow computer operable to interface with a first instrument suite associated with a first flow monitoring system, comprising:

a network;

a first input/output (I/O) block coupled to the network and operable to communicate with a plurality of sensors included in the first instrument suite;

a second I/O block coupled to the network and operable to communicate with a plurality of sensors included in the first instrument suite; and a first processing unit including a first display, the first processing unit being coupled to the network and operable to communicate with the first I/O block and the second I/O block to receive flow monitoring data from the sensors of the first instrument suite, process at least a subset of the flow monitoring data to generate flow output data, and generate a graphical image of the flow monitoring system on the display, the graphical image including at least a subset of the flow output data.

2. The flow computer of claim 1, wherein the flow monitoring data includes flow input data, and the first processing unit is further operable to display at least a portion of the flow input data on the graphical image.

3. The flow computer of claim 1, wherein the first processing unit comprises a panel computer.

4. The flow computer of claim 1, wherein the second I/O block is redundant to the first I/O block, and the first processing device is operable to select one of the first and second I/O blocks as being a primary source of the flow monitoring data and transition to the other of the first and second I/O blocks responsive to identifying a fault in the primary source.

5. The flow computer of claim 1, wherein the flow monitoring data processed by the first I/O block comprises meter I/O data, and the flow monitoring data processed by the second I/O block comprises at least one of prover or quality data.

6. The flow computer of claim 1, wherein the first flow monitoring system includes a first flow meter, and the flow monitoring data includes meter pulse data from the first flow meter.

7. The flow computer of claim 6, wherein the first I/O block is operable to interpolate the meter pulse data to generate fractional pulse data and provide the fractional pulse data to the first processing unit.

8. The flow computer of claim 1, further comprising a second I/O block coupled to the network and operable to communicate with a second instrument suite associated with a second flow monitoring system, the first processing device being operable to communicate with the second I/O block to receive flow monitoring data from the second instrument suite, process at least a subset of the flow monitoring data to generate flow output data associated with the second flow monitoring system, and generate a graphical image of the second flow monitoring system on the display, the graphical image including at least a subset of the flow output data associated with the second flow monitoring system.

9. The flow computer of claim 8, wherein the first processing unit is operable to display the graphical images of the first and second flow monitoring systems concurrently.

10. The flow computer of claim 1, further comprising a second processing unit coupled to the network and operable to communicate with the first I/O block and take over processing of the flow monitoring data responsive to identifying a fault condition with the first processing unit.

11. The flow computer of claim 1, wherein the network comprises a packet-based network.

12. The flow computer of claim 1, wherein the I/O block comprises a plurality of I/O modules, including at least one network communication module operable to communicate with the first processing unit over the network.

13. The flow computer of claim 12, wherein the plurality of I/O modules includes at least one of an input module, an output module, and a power module.

14. The flow computer of claim 12, wherein the plurality of I/O modules includes a frequency input module.

15. The flow computer of claim 14, wherein the frequency input module is operable to receive meter pulse data, interpolate the meter pulse data to generate fractional pulse data, and provide the fractional pulse data to the first processing unit.

16. The flow computer of claim 1, further comprising a second processing unit including a second display coupled to the network and operable to communicate with the first I/O block, wherein one of the first and second processing units is designated as having responsibility for generating the graphical image on its display.

17. A system, comprising:

a plurality of flow meter systems;

an instrument suite associated with each of the flow meter systems;

at least one I/O block associated with each instrument suite;

a network coupled to the I/O blocks; and a first processing unit coupled to the network and operable to receive flow monitoring data associated with a first subset including at least two of the flow meter systems from the I/O blocks and process the flow monitoring data to generate flow output data for the first subset of the flow meter systems.

18. The system of claim 17, wherein the first processing unit includes a display and is operable to generate graphical images of each flow meter system in the first subset, the graphical image including at least a portion of the flow output data for each flow monitoring system in the first subset.

19. The system of claim 17, wherein at least one of the I/O blocks includes a frequency input module operable to receive meter pulse data, interpolate the meter pulse data to generate fractional pulse data, and provide the fractional pulse data to the first processing unit.

20. The system of claim 17, further comprising a second processing unit coupled to the network and operable to receive flow monitoring data associated a second subset of the flow meters from the I/O blocks and process the flow monitoring data to generate flow output data for the second subset of flow meter systems.

21. The system of claim 20, wherein the first and second subsets overlap, and the second processing unit is redundant to the first processing unit.

22. The system of claim 17, further comprising at least two redundant I/O blocks associated with one of the instrument suites, one of the two redundant I/O blocks being designated as primary and the other being designated as secondary.

23. The system of claim 17, further comprising at least two I/O blocks associated with one of the instrument suites, one of the two I/O blocks being operable to communicate meter data and the other being operable to communicate at least one of prover or quality data.

24. The system of claim 17, wherein the network comprises a packet-based network.

* * * * *